(12) United States Patent
Kiely et al.

(10) Patent No.: US 10,240,975 B2
(45) Date of Patent: Mar. 26, 2019

(54) LASER POWER MONITORING IN A HEAT-ASSISTED MAGNETIC RECORDING DEVICE USING A RESISTIVE SENSOR AND HIGH-FREQUENCY LASER MODULATION

(71) Applicant: Seagate Technology LLC, Cupertino, CA (US)

(72) Inventors: James Dillon Kiely, Edina, MN (US); John Charles Duda, Bloomington, IN (US); Patrick Carl Fletcher, Minnetonka, MN (US); Andrei Dorobantu, San Diego, CA (US); Jon D. Trantham, Chanhassen, MN (US)

(73) Assignee: Seagate Technology LLC, Cupertino, CA (US)

( * ) Notice: Subject to any disclaimer, the term of this patent is extended or adjusted under 35 U.S.C. 154(b) by 235 days.

(21) Appl. No.: 15/190,462

(22) Filed: Jun. 23, 2016

(65) Prior Publication Data

US 2017/0370770 A1 Dec. 28, 2017

(51) Int. Cl.
*G01J 1/42* (2006.01)
*G01K 7/16* (2006.01)

(52) U.S. Cl.
CPC ............. *G01J 1/4257* (2013.01); *G01K 7/16* (2013.01)

(58) Field of Classification Search
None
See application file for complete search history.

(56) References Cited

U.S. PATENT DOCUMENTS

| 9,153,276 | B2 | 10/2015 | Johnson et al. |
| 9,202,499 | B2 | 12/2015 | Kiely et al. |
| 2013/0107680 | A1 | 5/2013 | Contreras et al. |
| 2015/0036469 | A1* | 2/2015 | Johnson ................. G11B 13/08 369/13.33 |

* cited by examiner

*Primary Examiner* — Edwin C Gunberg
(74) *Attorney, Agent, or Firm* — Hollingsworth Davis, LLC

(57) ABSTRACT

An apparatus comprises a light source configured to generate light, and a modulator coupled to the light source and configured to modulate the light above a predetermined frequency. A slider is configured for heat-assisted magnetic recording and to receive the modulated light. A resistive sensor is integral to the slider and subject to heating by absorption of electromagnetic radiation and conduction of heat. Measuring circuitry is coupled to the resistive sensor and configured to measure a response of the resistive sensor due to absorbed electromagnetic radiation and not from the heat conduction. The measuring circuitry may further be configured to determine output optical power of the light source using the measured resistive sensor response.

20 Claims, 7 Drawing Sheets

LASER POWER MONITORING IN A HEAT-ASSISTED MAGNETIC RECORDING DEVICE USING A RESISTIVE SENSOR AND HIGH-FREQUENCY LASER MODULATION

SUMMARY

Embodiments are directed to a method comprising modulating light generated by a light source situated in, at, or near a slider above a predetermined frequency, the slider comprising a resistive sensor. The method also comprises communicating the modulated light from the light source, through the slider, and to an intended focus location of the slider. In response to the modulated light, the resistive sensor is heated by absorption of electromagnetic radiation and conduction of heat from heat sources proximate to the resistive sensor. The method further comprises measuring a response of the resistive sensor due to the absorbed electromagnetic radiation and not from the heat conduction. The method may also comprise determining output optical power of the light source using the measured resistive sensor response.

Other embodiments are directed to an apparatus comprising a light source configured to generate light, and a modulator coupled to the light source and configured to modulate the light above a predetermined frequency. A slider is configured for heat-assisted magnetic recording and to receive the modulated light. A resistive sensor is integral to the slider and subject to heating by absorption of electromagnetic radiation and conduction of heat. Measuring circuitry is coupled to the resistive sensor and configured to measure a response of the resistive sensor due to absorbed electromagnetic radiation and not from the heat conduction. The measuring circuitry may further be configured to determine output optical power of the light source using the measured resistive sensor response.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to heat-assisted magnetic recording (HAMR), also referred to as energy-assisted magnetic recording (EAMR), thermally-assisted magnetic recording (TAMR), and thermally-assisted recording (TAR). This technology uses a laser source and a near-field transducer (NFT) to heat a small spot on a magnetic disk during recording. The heat lowers magnetic coercivity at the spot, allowing a write transducer to change the orientation of a magnetic domain at the spot. Due to the relatively high coercivity of the medium after cooling, the data is less susceptible to superparamagnetic effects that can lead to data errors.

Figure 1:
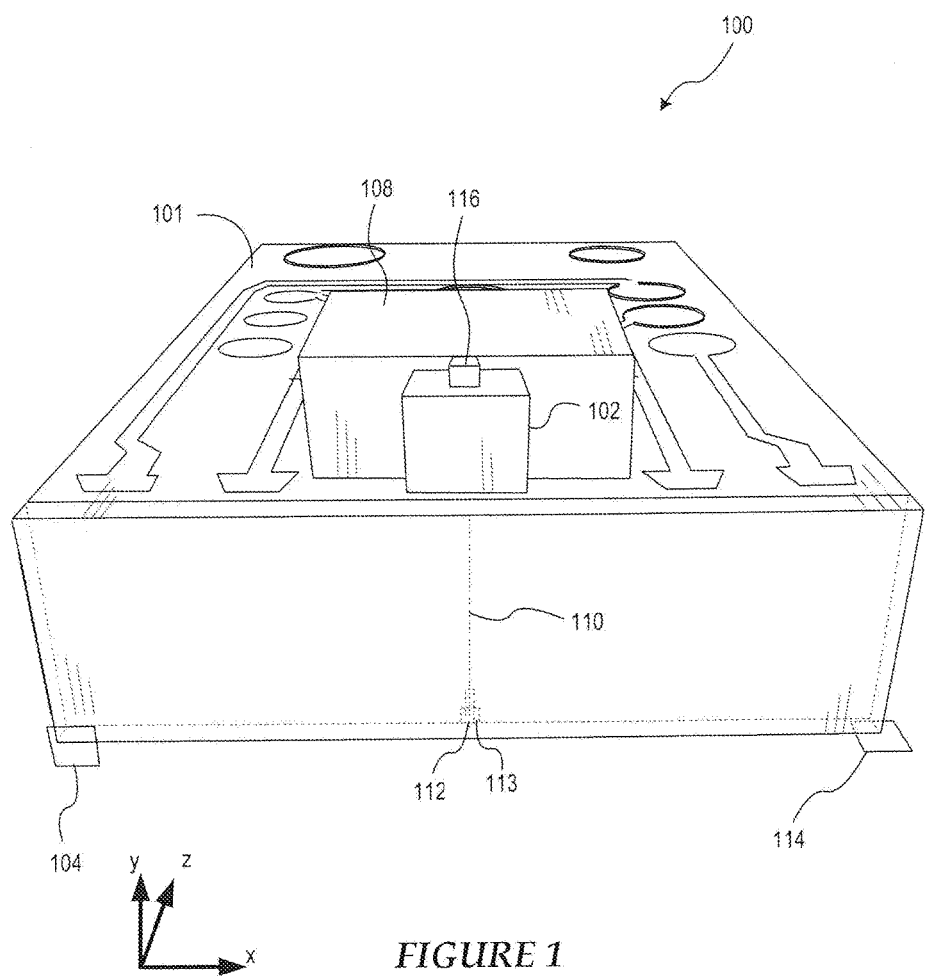
FIG. 1 is a perspective view of a HAMR slider with which various embodiments disclosed herein may be implemented.
Figure 2:
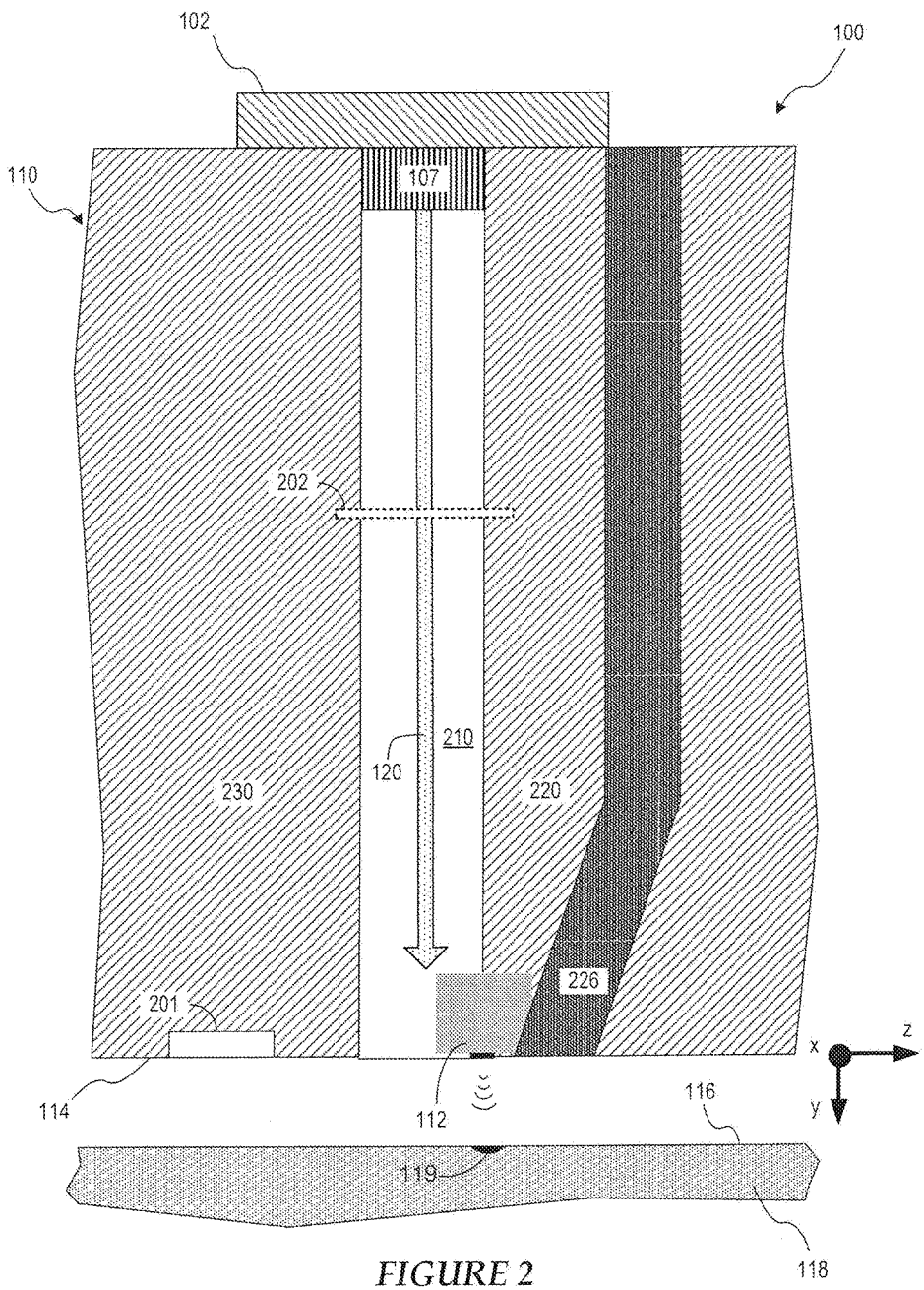
FIG. 2 is a cross-sectional view of a HAMR slider with which various embodiments disclosed herein may be implemented.

Embodiments of a HAMR head 100 are illustrated in FIGS. 1 and 2. As shown, the head 100 (also referred to as a slider) includes a light source (e.g., a laser diode) 102 located proximate a trailing edge surface 104 of the slider body 101. An optical wave (e.g., a laser beam) 120 generated by the light source 102 is delivered to an NFT 112 via an optical waveguide 110. The NFT 112 is aligned with a plane of an air bearing surface (ABS) 114 of the head 100, and one edge of a read/write head 113 is on the ABS 114. The read/write head 113 includes at least one writer and at least one reader. In some embodiments, multiple writers (e.g., 2 writers) and multiple readers (e.g., 3 readers) can be incorporated into the read/write head 113. The ABS 114 faces, and is held proximate to, a surface 116 of a magnetic medium 118 during device operation. The ABS 114 is also referred to as a media-facing surface.

The light source 102 in this representative example may be an integral, edge firing device, although it will be appreciated that any source of electromagnetic energy may be used. For example, a surface emitting laser (SEL), instead of an edge firing laser, may be used as the source 102. A light source may also be mounted alternatively to other surfaces of the head 100, such as the trailing edge surface 104. While the representative embodiments of FIGS. 1 and 2 show the waveguide 110 integrated with the head 100, any type of light delivery configuration may be used. As shown in FIG. 1, the laser diode 102 is shown coupled to the slider body 101 via a submount 108. The submount 108 can be used to orient and affix an edge-emitting laser diode 102 so that its output is directed downwards (negative y-direction in the figure). An input surface of the slider body 101 may include a grating, an optical coupler, or other coupling features to receive light from the laser diode 102.

When writing with a HAMR device, electromagnetic energy is concentrated onto a small hotspot 119 over the track of the magnetic medium 118 where writing takes place, as is shown in the embodiment of FIG. 2. The light from the light source 102 propagates to the NFT 112, e.g., either directly from the light source 102 or through a mode converter or by way of a focusing element. FIG. 2, for example, shows an optical coupler 107 adjacent the light source 102, which is configured to couple light produced from the light source 102 to the waveguide 110.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 119 is on the order of 50 nm or less. Thus, the desired hot spot size is well below half the wavelength of the light. Optical focusers cannot be used to obtain the desired hot spot size, being diffraction limited at this scale. As a result, the NFT 112 is employed to create a hotspot on the media.

The NFT 112 is a near-field optics device configured to generate local surface plasmon resonance at a designated (e.g., design) wavelength. The NFT 112 is generally formed from a thin film of plasmonic material on a substrate. In a HAMR head 100, the NFT 112 is positioned proximate the write pole 226 of the read/write head 113. The NFT 112 is aligned with the plane of the ABS 114 parallel to the surface 116 of the magnetic medium 118. The waveguide 110 and optional mode converter 107 and/or other optical element directs electromagnetic energy 120 (e.g., laser light) onto the NFT 112. The NFT 112 achieves surface plasmon resonance in response to the incident electromagnetic energy 120. The plasmons generated by this resonance are emitted from the NFT 112 towards the magnetic medium 118 where they are absorbed to create a hotspot 119. At resonance, a high electric field surrounds the NFT 112 due to the collective oscillations of electrons at the metal surface (e.g., substrate) of the magnetic medium 118. At least a portion of the electric field surrounding the NFT 112 gets absorbed by the magnetic medium 118, thereby raising the temperature of a spot 119 on the medium 118 as data is being recorded.

FIG. 2 shows a detailed partial cross-sectional view of an embodiment of the HAMR head 100 in accordance with various embodiments. The waveguide 110 includes a layer of core material 210 surrounded by first and second cladding layers 220 and 230. The first cladding layer 220 is shown proximate the NFT 112 and the write pole 226. The second cladding layer 230 is spaced away from the first cladding layer 220 and separated therefrom by the waveguide core 210. The core layer 210 and cladding layers 220 and 230 may be fabricated from dielectric materials, such as optical grade amorphous material with low thermal conductivities. The first and second cladding layers 220 and 230 may each be made of the same or a different material. The materials are selected so that the refractive index of the core layer 210 is higher than refractive indices of the cladding layers 220 and 230. This arrangement of materials facilitates efficient propagation of light through the waveguide core 210. Optical focusing elements (not shown) such as mirrors, lenses, etc., may be utilized to concentrate light onto the NFT 112. These and other components may be built on a common substrate using wafer manufacturing techniques known in the art. The waveguide 110 may be configured as a planar waveguide or channel waveguide.

According to some embodiments, the head 100 includes one or more contact sensors, such as the contact sensor 201 shown in FIG. 2. The contact sensor 201 can be configured to sense for one or more of head-medium contact, thermal asperities, and voids of a magnetic recording medium. The contact sensor 201 is preferably a resistive sensor that can be implemented as a thermal sensor, such as a resistive temperature sensor (e.g., TCR sensor). For example, the contact sensor 201 can be implemented as a DETCR (Dual Ended Thermal Coefficient of Resistance) sensor. The contact sensor 201 can be situated at or near the ABS 114 and proximate the NFT 112. As such, the contact sensor 201 can serve as a temperature sensor for the NFT 112 and as a head-medium/asperity contact sensor. In addition, the contact sensor 201 can serve as a laser power monitor responsive to high-frequency laser light modulation in accordance with various embodiments disclosed herein.

According to some embodiments, the head 100 shown in FIG. 2 can incorporate a bolometer 202 situated in the vicinity of the light path (e.g., the waveguide 110) and proximal of the NFT 112 in accordance with various embodiments. According to some embodiments, the bolometer 202 comprises an optical-to-thermal transducer configured to respond to fluctuations in output optical power of the laser 102. In some embodiments, the bolometer 202 comprises a thin metallic wire placed across the light path (e.g., the waveguide 110) within the internal body of the slider 100 at a location between the coupler 107 and the NFT 112. A small fraction of the output optical power of the laser 102 transmitted via the light path is absorbed by the wire and converted into thermal power, thereby increasing wire temperature. Fluctuations in output optical power of the laser 102 correlate to fluctuations in thermal power and temperature of the bolometer 202. These fluctuations in temperature can be detected by circuitry configured to monitor the resistance fluctuations in the wire by using a small bias current and a high thermal coefficient of resistance material. The bolometer 202 can be placed in the light path or adjacent to optics to harvest scattered light. The bolometer 202 can serve as a laser power monitor responsive to high-frequency laser light modulation in accordance with various embodiments disclosed herein.

As shown in FIG. 2, the bolometer 202 has a longitudinal axis that is oriented transverse to the longitudinal axis of the waveguide 110. More particularly, the bolometer 202 shown in FIG. 2 has a longitudinal axis that is oriented substantially normal to the longitudinal axis of the waveguide 110. In some embodiments, the bolometer 202 is spaced away from a core 210 of the waveguide 110 and positioned above the waveguide 110 in the x-direction. In other embodiments, the bolometer 202 is spaced away from a core 210 and positioned below the waveguide 110 in the x-direction. Rather than being oriented normal to the waveguide 110, the longitudinal axis of the bolometer 202 can be oriented diagonally with respect to the longitudinal axis of the waveguide 110. Orienting the bolometer 202 diagonally with respect to the waveguide 110 serves to expose more surface area of the bolometer 202 to optical energy transmitted along the waveguide 110 than a perpendicular orientation.

The output of a laser diode used in a HAMR drive is temperature sensitive and susceptible to self-heating. During write operation, for example, laser diode heating can vary the junction temperature of the laser diode, causing a shift in laser emission wavelength, leading to a change of optical feedback from the optical path in the slider to the cavity of the laser diode, a phenomenon that is known to lead to mode hopping and/or power instability of the laser diode. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in laser diodes. Mode hopping is problematic for HAMR applications, as mode hopping leads to laser output power jumping and magnetic transition shifting from one block of data to another. Large transition shifts in a block of data may not be recoverable by channel decoding, resulting in error bits. Accurate laser power monitoring can be particularly helpful is avoiding mode hopping in HAMR devices.

Embodiments of the disclosure are directed to apparatuses and methods for measuring a response of a resistive sensor of a HAMR recording head due to electromagnetic radiation absorption, and not to heat conduction. Embodiments of the disclosure are directed to apparatuses and methods for monitoring laser output optical power using a response of a resistive sensor of a HAMR recording head to electromagnetic radiation absorption, and not from heat conduction. Embodiments of the disclosure are directed to apparatuses and methods for monitoring the light delivery system of a HAMR drive inside (in-situ) the drive.

According to various embodiments, a HAMR recording head (slider) is fabricated to incorporate a resistive sensor (e.g., a thermal sensor), such as a thin metal wire with nanometer cross-section dimensions, for detecting head-disk contact and thermal asperities. One such resistive sensor is referred to herein as a Dual-Ended Thermal Coefficient of Resistance (DETCR) sensor. In addition to serving as a contact sensor, a DETCR can be used to detect and/or measure light in the HAMR slider. When laser light propagates through the slider in the optical waveguide, structures at various locations within the slider absorb light and are subject to heating. For example, the writer pole is heated by light absorption and also produces heat. The DETCR may be heated by heat conduction from the writer pole and other heat sources of the slider in proximity to the DETCR. In addition, the DETCR may be heated by direct light absorption, referred to herein as absorption of electromagnetic radiation.

The location of a DETCR in the slider and the characteristics of the DETCR make it a useful sensor for measuring the power of incident light produced by the light source (e.g., laser diode) of the slider. An ideal sensor for measuring the power of incident light (e.g. an ideal laser power monitoring sensor) is one that responds only to direct light absorption (absorption of electromagnetic radiation). However, as is discussed above, the EM radiation absorption response of the DETCR is confounded by heating due to conduction of heat from surrounding structures of the slider. In order to use the DETCR as a bolometer (a sensor for measuring the power of incident light) with good signal-to-noise characteristics, it is desirable to separate the DETCR heating due to direct light absorption from heating due to heat conduction. Embodiments of the disclosure are directed to apparatuses and methods that utilize modulated light generated by a light source (e.g., laser diode) having frequencies at which only direct light absorption heats the DETCR.

The penetration depth at which time-varying heating occurs by thermal conduction within a HAMR slider is determined by the thermal diffusivity of the material being heated. With the complex structures in a HAMR slider, the thermal diffusivity is non-homogenous and therefore complex to calculate, but the measured thermal time constant is on the order of several microseconds. In contrast, DETCR heating by direct light absorption is limited only by the heat capacity and thermal mass of the DETCR wire and can occur at speeds much faster than 1 microsecond. By measuring the heating response of the DETCR as a function of laser modulation frequency, the minimum response time of heat conduction to a time-varying signal can be identified. Once this is identified, measurements done with smaller response times, or higher frequencies, will only observe direct light absorption. The disclosed techniques can be used for design validation, internal test methods, volume production testing, drive diagnostic testing, failure mode evaluation, in situ monitoring of light delivery and thermal changes, or for drive life monitoring, for example.

Figure 3:
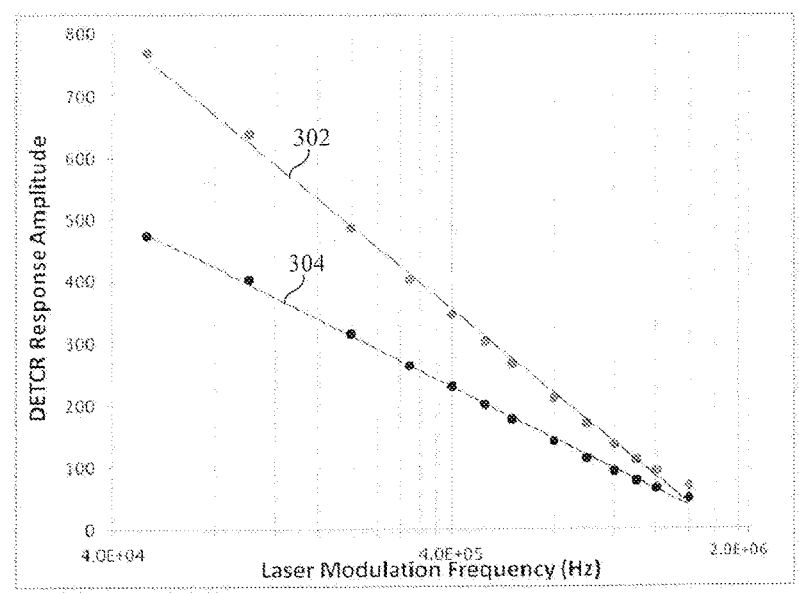
FIG. 3 shows responses of two resistive sensors situated in a region of a HAMR slider where the resistive sensors were obstructed from modulated laser light.

FIG. 3 shows the response of two DETCRs situated in a region of a HAMR slider in which the DETCR devices are obstructed from the waveguide by large light absorbing structures (writer pole and shields). That is, the DETCRs are not heated by direct light absorption. In this type of design, the DETCRs are heated only by heat conduction from other structures within the slider. The y-axis of FIG. 3 is DETCR modulation amplitude, and the x-axis is laser modulation frequency (Hz). Curve 302 is the response of a first DETCR, and curve 304 is the response of a second DETCR. Both curves 302 and 304 show that the amplitude of the DETCR signals (indicative of sensor resistance) decreases with increasing laser modulation frequency. FIG. 3 demonstrates that at higher laser modulation frequencies, heat is not conducted fast enough and as a result, the DETCR signal continues to decrease to noise levels.

Figure 4:
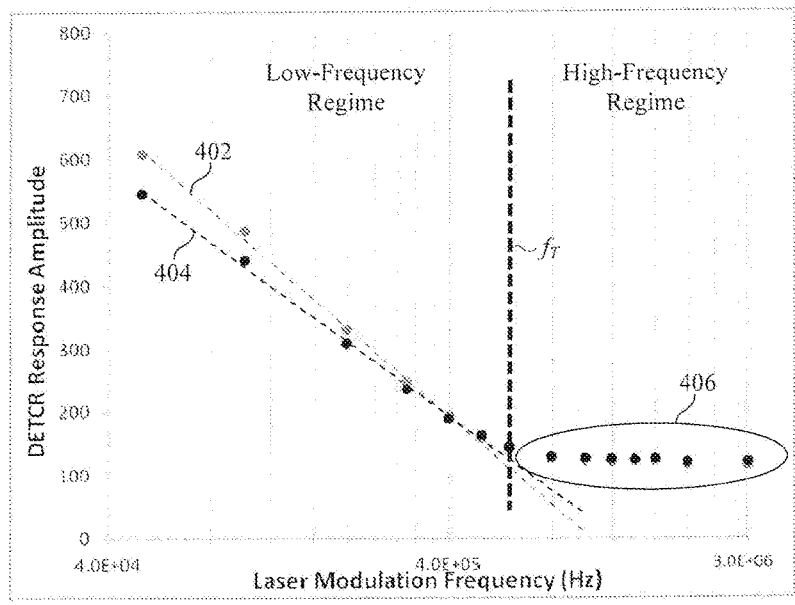
FIG. 4 shows the responses of two resistive sensors situated in a region of a HAMR slider where the resistive sensors received modulated laser light.

In FIG. 4, the light from a laser diode in a HAMR slider was modulated by a small amount and the frequency at which the light was modulated was systematically varied. In this illustrative embodiment, the modulation was achieved by using a test feature of the drive preamp and standard laboratory electronics. In this illustrative embodiment, the recording heads were in full read-write operation on a spinstand tester. It is understood that this embodiment can be directly applied to volume testing or drive operation (e.g., in situ a HAMR drive). The response to two DETCRs (e.g., curves 402 and 404) was measured using a standard DETCR design and standard DETCR signal collection and amplification electronics. In contrast to FIG. 3, the two DETCRs were situated in a region of a HAMR slider in which the DETCR devices were exposed to light from the waveguide. In this case, the narrow-band power of the DETCR signals was measured at each modulation frequency using a technique similar to lock-in amplification. An alternative approach would be to perform Fourier transform analysis at the laser modulation frequency.

FIG. 4 shows the DETCR responses (curves 402 and 404) with two distinct frequency regimes: one in which the narrow-band power decreases with increasing frequency (low-frequency regime) and one in which the narrow-band power is independent of frequency (high-frequency regime). For this particular resistive sensor design, this transition occurs near 500-600 kHz. It is understood that the transition frequency, $f_T$, will vary depending on the design of the DETCR or resistive sensor being used, such as between 400 KHz and 1 MHz, for example. Other useful ranges include between about 200 kHz and 2 MHz, and between about 100 kHz and 10 MHz.

It can be seen in FIG. 4 that the amplitude of the DETCR responses is substantially independent of laser modulation frequency at frequencies above the transition frequency, $f_T$, (see encircled data points 406). At frequencies above the transition frequency, $f_T$, the DETCR responses are indicative of direct light heating (due only to absorption of electromagnetic radiation) and can be used to identify changes in the amount of light reaching the transducer region of a HAMR recording head. It can be seen in FIG. 3 that there is no high-frequency response region for the optically shielded DETCRs. A comparison between FIGS. 3 and 4 confirms that the DETCR responses at frequencies above the transition frequency, $f_T$, are purely due to direct light absorption and not from thermal conduction. As such, a DETCR or other resistive sensor operating in the high-frequency regime produces a response that is purely due to absorption of electromagnetic radiation, and not from thermal conduction, which can be accurately correlated to output optical power of the light source (e.g., laser diode) of the slider.

Figure 5:
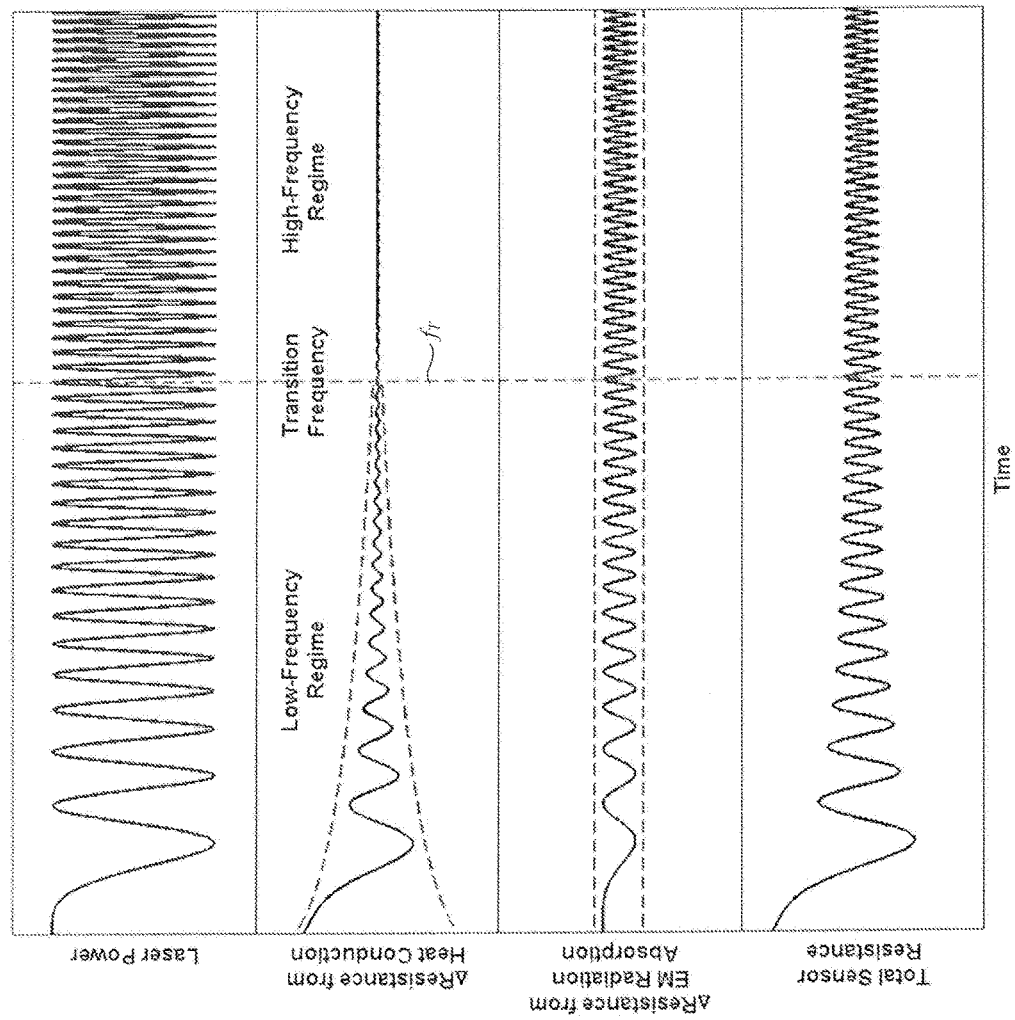
FIGS. 5A-5D illustrate the frequency-dependent nature of a resistive sensor of a HAMR recording head in accordance with various embodiments.

FIGS. 5A-5D illustrate the frequency-dependent nature of a resistive sensor, such as a DETCR sensor, in accordance with various embodiments. In FIG. 5A, a laser input signal is shown having a frequency that increases with time. The modulating laser input signal shown in FIG. 5A can be used to produce a modulated laser output signal which is communicated through the slider to an intended focus location (e.g., a near-field transducer). In this illustrative example, it is assumed that a resistive sensor of the slider is either in the light path or receives stray light that is exiting the optical waveguide or the slider. The resistive sensor can be a DETCR, a bolometer, or other thermal sensor.

FIGS. 5B-5D are signals indicative of changes in resistance of the resistive sensor in response to modulated laser light generated by a laser diode driven with the laser input signal shown in FIG. 5A. FIG. 5B shows the contribution of conductive heating to changes in the resistance of the resistive sensor. As can be seen in FIG. 5B, the amplitude of the conductive heating component of the resistive sensor resistance falls off exponentially with increasing laser input signal frequency until a transition frequency, $f_T$, is reached. At modulated laser light frequencies greater than the transition frequency, $f_T$, the amplitude of the conductive heating component of the resistive sensor resistance is at or near zero.

FIG. 5B clearly illustrates that the resistive sensor has a response to conductive heating that falls into two distinct regimes, a low-frequency regime (below $f_T$) and a high-frequency regime (above $f_T$). In other words, the AC component of the resistive sensor resistance due to conductive heating decreases with increasing modulated laser light frequency until a transition frequency, $f_T$, is reached, after which the conductive heating component of the resistive sensor resistance is at or near DC (e.g., substantially devoid of the conductive heating component). FIG. 5B shows that the contribution from conductive heating to changes in the resistance of the resistive sensor becomes negligible at (and above) the transition frequency, $f_T$.

FIG. 5C shows the contribution from electromagnetic radiation absorption to changes in the resistance of the resistive sensor. It can be seen in FIG. 5C that the amplitude of the EM radiation absorption component of the sensor resistance is relatively constant for modulated laser light frequencies below and above the transition frequency, $f_T$. In other words, the amplitude of the EM radiation absorption heating component of the sensor resistance does not vary with increasing modulated laser light frequency.

FIG. 5D illustrates changes in the total resistance of the resistive sensor due to the combined contribution of heat conduction and electromagnetic radiation absorption. In the low-frequency regime (below $f_T$), the resistance of the resistive sensor changes due to both heat conduction and EM radiation absorption. In the high-frequency regime (above $f_T$), however, changes in the resistance of the resistive sensor is due only to EM radiation absorption, and not from thermal conduction.

Figure 6:
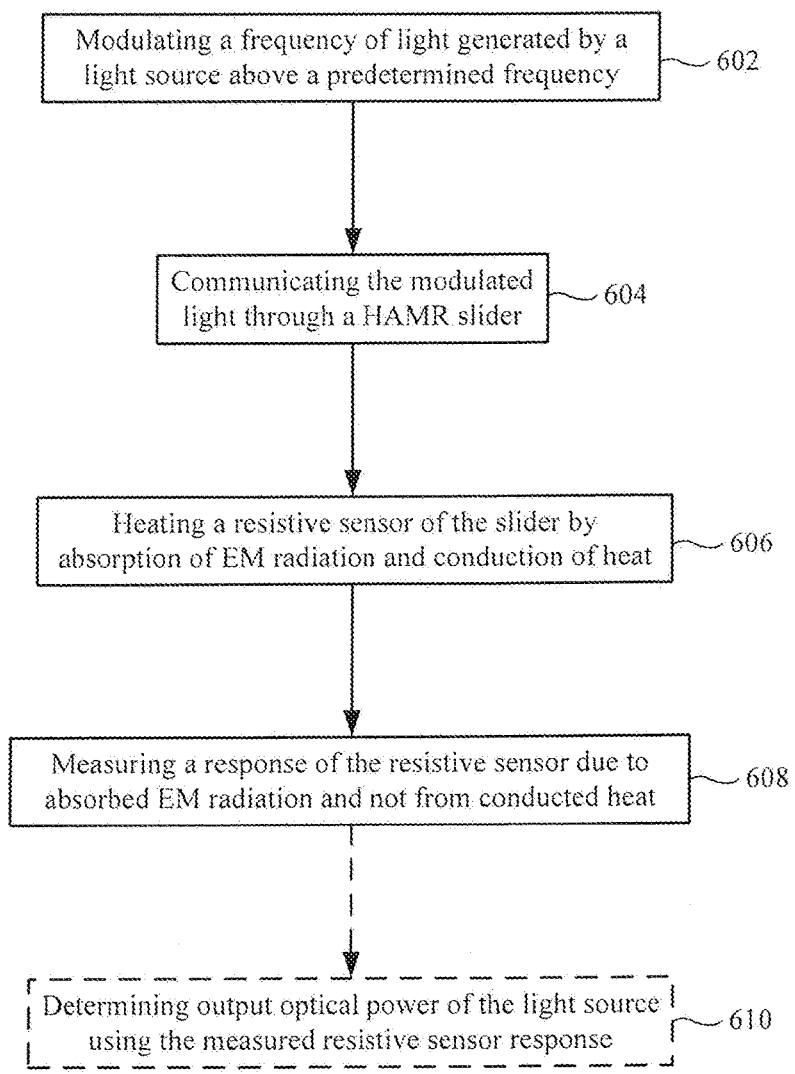
FIG. 6 illustrates a method for measuring a response of a resistive sensor in a HAMR slider in accordance with various embodiments.

Turning now to FIG. 6, a method is described for measuring the response of a resistive sensor in a HAMR slider in accordance with various embodiments. The method in FIG. 6 involves modulating 602 a frequency of light generated by a light source above a predetermined frequency (e.g., the transition frequency, $f_T$). The light source may be a laser diode, for example, situated in, at, or near a HAMR slider. The method involves communicating 604 the modulated light through the HAMR slider to an intended focus location of the slider (e.g., to a near-field transducer). In response to the modulated light, a resistive sensor of the slider is heated 606 by absorption of electromagnetic radiation and conduction of heat from heat sources proximate the resistive sensor. The method further involves measuring 608 a response of the resistive sensor due to absorbed electromagnetic radiation and not from conducted heat.

The method may also involve determining 610 output optical power of the light source using the measured resistive sensor response. In some embodiments, the resistive sensor can be a bolometer. In other embodiments, the resistive sensor can be a contact sensor, such as DETCR sensor, which can serve as both a contact sensor (e.g., for head-disk contact detection and/or thermal asperity detection) and an output optical power sensor for the light source (e.g., laser diode) of the slider.

Figure 7:
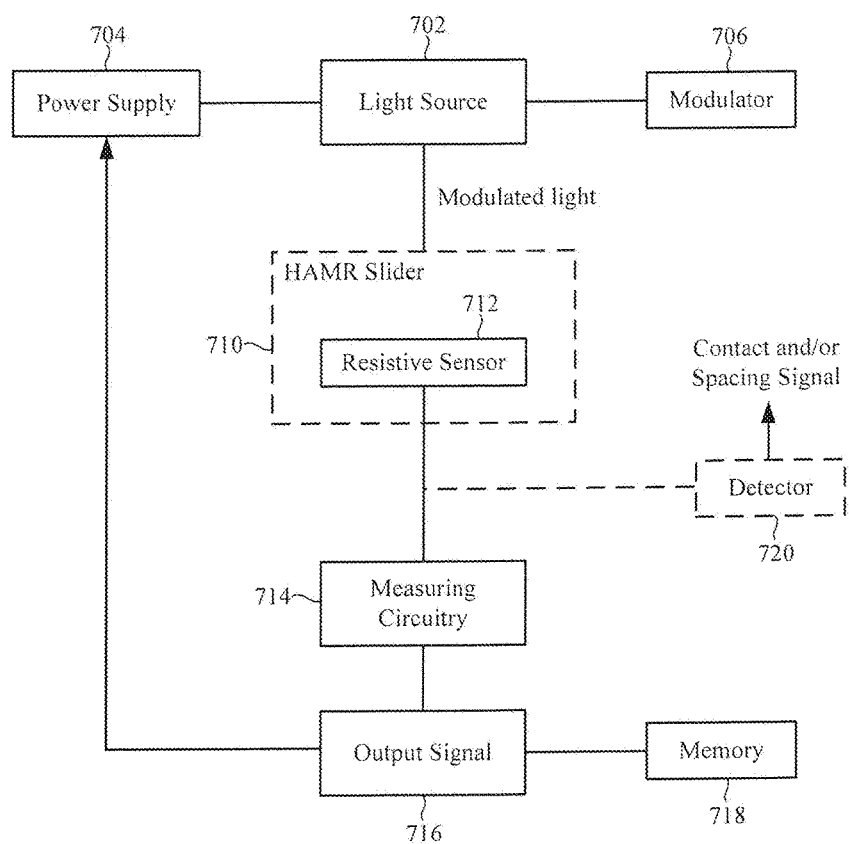
FIG. 7 is a block diagram of a system for laser power monitoring in a HAMR drive using a resistive sensor and high-frequency laser light modulation in accordance with various embodiments.

FIG. 7 is a block diagram of a system for laser power monitoring in a HAMR drive using a resistive sensor and high-frequency laser light modulation in accordance with various embodiments. The system shown in FIG. 7 includes a light source 702, such as a laser diode, coupled to a power supply 704. The light source 702 is coupled to a modulator 706 which is configured to modulate output light produced by the light source 702. The modulator 706 is configured to modulate light produced by the light source 702 above a predetermined frequency, such as the threshold frequency, $f_T$, discussed previously.

Modulated light produced by the light source 702 is communicated to a HAMR slider 710 which includes a resistive sensor 712. The modulated light has a frequency at which the response of the resistive sensor 712 is due only to absorbed electromagnetic radiation and not from heat conduction. As was discussed previously, the modulation frequency of the light is dependent on the transition frequency, $f_T$, for the particular design of the resistive sensor 712. As such, the modulated light has a frequency equal to or greater than the transition frequency, $f_T$. The resistive sensor 712 can be a DETCR sensor, a bolometer, or other thermal sensor, for example. The resistive sensor 712 is positioned in the light path of the HAMR slider 710 or other location of the slider 710 where stray light can be observed.

Measuring circuitry 714 is coupled to the resistive sensor 712. The measuring circuitry 714 is configured to receive a modulating (AC) resistance signal produced by the resistive sensor 712, such as the resistive sensor signal shown in FIG. 5D. The measuring circuitry 714 is configured to measure the response of the resistive sensor 712 as a function of the modulation frequency of the light. In some embodiments, the measuring circuitry 714 is configured to measure the response of the resistive sensor at or near the predetermined frequency or at twice the predetermined frequency of the modulated light. The measuring circuitry 714, for example, can be configured to measure an average amplitude of the resistive sensor response. The measuring circuitry 714 produces an output signal 716 which can be stored in a memory 718.

In some embodiments, the measuring circuitry 714 is further configured to determine output optical power of the light source 702 using the measured resistive sensor response. The output signal from resistive sensor 712 can be used to compute the optical power of the light source once the output has been calibrated. One method would be to calibrate the resistive sensor output to the light source input power while the drive is executing factory calibration routines. The output signal 716, which is indicative of optical output power of the light source 702, can be fed back to the power supply 704 and used to adjust the current supplied to the light source 702.

As was discussed previously, the resistive sensor 712 can be implemented as a contact sensor, such as a DETCR sensor. In such embodiments, the output from the resistive sensor 712 can be communicated to a detector 720. The detector 720 is configured to detect contact and/or spacing changes between the HAMR slider 710 and a magnetic recording medium using known techniques.

Figure 8:
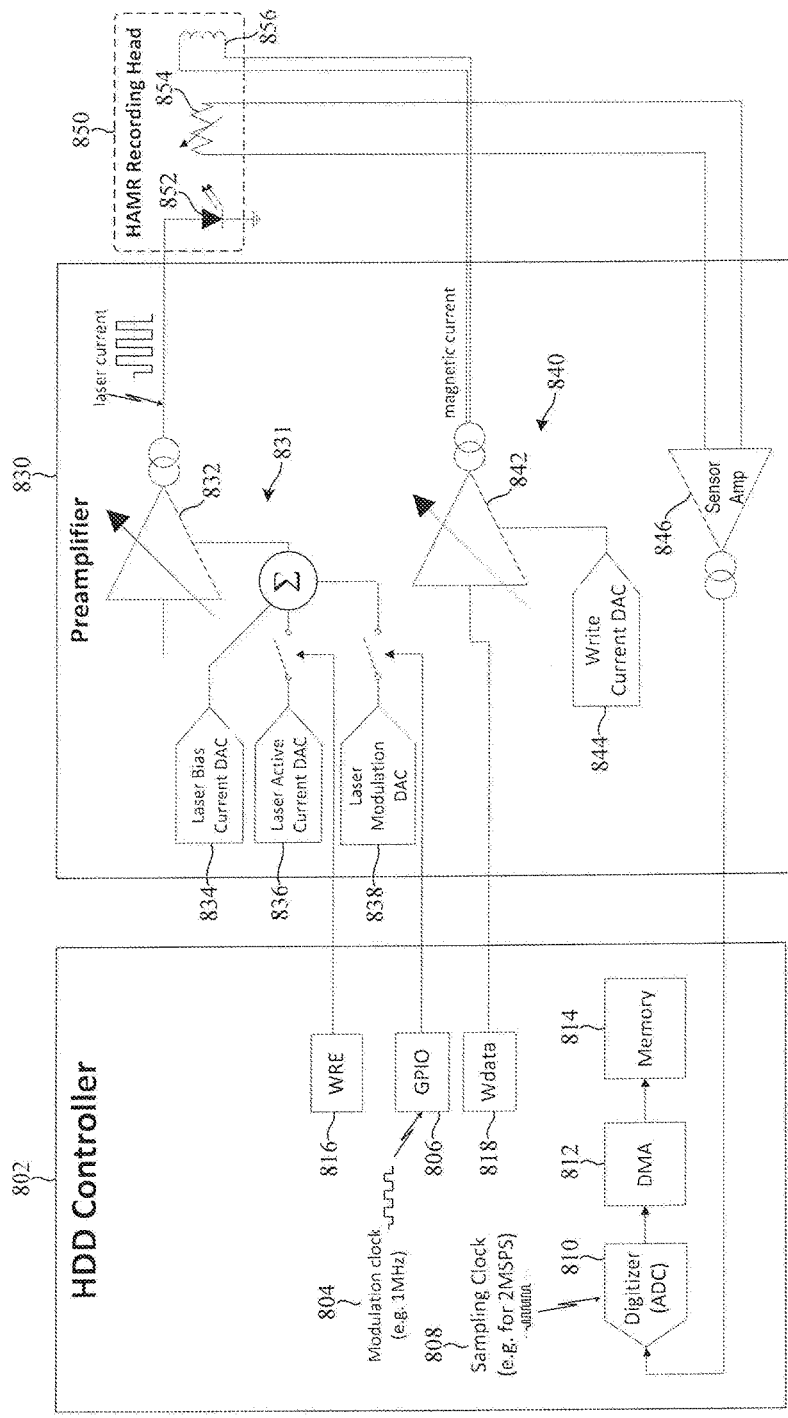
FIG. 8 is a block diagram of a system for laser power monitoring in a HAMR drive using a resistive sensor and high-frequency laser light modulation in accordance with various embodiments.

FIG. 8 is a block diagram of a system for laser power monitoring in a HAMR drive using a resistive sensor and high-frequency laser light modulation in accordance with various embodiments. FIG. 8 shows the electrical architecture for performing modulated laser power measurements in accordance with various embodiments. The system shown in FIG. 8 includes a hard disk drive (HDD) controller 802 (e.g., an ASIC), a preamplifier 830, and a HAMR recording head 850. The HAMR recording head 850 includes a laser diode 852, a resistive sensor 854 (e.g., a DETCR or bolometer), and a write head 856. Although not shown, the HAMR recording head 850 includes one or more read heads.

The preamplifier 830 includes laser driver circuitry 831, writer driver circuitry 840, and a sensor amplifier 846. The preamplifier 830 includes an amplifier 832 coupled to a laser bias current digital-to-analog converter (DAC) 834, a laser active current DAC 836, and a laser modulation DAC 838. The laser bias current DAC 834 sets the bias current of the laser diode 852. The laser active current DAC 836, controlled by a write enable pin (WRE) 816 of the HDD controller 802, sets the operating current of the laser diode 852 during write operations. The laser modulation DAC 838, controlled by the general-purpose input-output pin (GPIO) 806 of the HDD controller 802, sets the modulation frequency of the laser input signal produced by the amplifier 832 and applied to the laser diode 852.

A clock signal is generated by a modulation clock 804 in the HDD controller 802. The frequency of the clock signal determines the modulation frequency of the light generated by the laser diode 852. According to various embodiments, the clock signal generated by the modulation clock 804 has a frequency above the transition frequency, $f_T$, of the resistive sensor 854. The clock signal generated by the modulation clock 804 is communicated to the GPIO pin 806. When the signal on the GPIO pin 806 asserts, the signal causes an increase in the laser diode current. A register in the preamplifier 830 sets the laser modulation DAC output level, allowing for modulation amplitude adjustability. The writer driver circuitry 840 includes an amplifier 842 coupled to a write current DAC 844. A write data (Wdata) pin 818 of the HDD controller 802 is coupled to the write amplifier 842 and controls the polarity of magnetic current supplied to the write head 856.

The resistive sensor 854 of the HAMR recording head 850 is coupled to the sensor amplifier 846. The output of the sensor amplifier 846 is coupled to an input of a digitizer (analog-to-digital converter) 810. The output of the digitizer 810 is coupled to a DMA controller 812, which is coupled to a memory 814. A sampling clock 808 is coupled to the digitizer 810. The sampling clock 808 is synchronized to the modulation clock 804. For example, sampling of the amplified resistive element signal by the digitizer 810 can be performed at twice the modulation frequency of the light produced by the laser diode 852 (e.g., 2× the modulation clock signal). By sampling at twice the modulation frequency of the clock signal produced by the modulation clock 804, the sampling performed by the digitizer 810 captures alternating resistive sensor signals with the laser diode on and off. Measurements from the digitizer 810 preferably correspond to the average amplitude of the resistive sensor signals. The measurements produced by the digitizer 810 are stored in the memory 814 via the DMA controller 812 for later post-processing by the firmware of the HAMR drive.

It is understood that the electrical architecture shown in FIG. 8 represents a non-limiting embodiment of a system for laser power monitoring in a HAMR drive using a resistive sensor and high-frequency laser light modulation. Other electrical architectures are contemplated. For example, in some embodiments, an HDD controller 802 that lacks ADCs can use external ADCs. Sampling and digitization can be performed in the preamplifier 830 rather than the HDD controller 802, for example. Laser current modulation can be performed by changing the bias current (via the laser bias current DAC 834) and active current (via the laser active current DAC 836) supplied to the laser diode 852 via register writes. Also, the amplified resistive sensor signal produced by the sensor amplifier 846 can be processed by a Fourier transform analysis circuit operating at the laser modulation frequency (e.g., same frequency as the modulation clock signal) rather than by the digitizer 810 shown in FIG. 8.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A method, comprising:
   modulating light generated by a light source situated in, at, or near a slider above a predetermined frequency, the slider comprising a resistive sensor;
   communicating the modulated light from the light source, through the slider, and to an intended focus location of the slider;
   heating the resistive sensor by absorption of electromagnetic radiation and conduction of heat from heat sources proximate the resistive sensor;
   producing, by the resistive sensor in response to the modulated light above the predetermined frequency, a response due to absorption of the electromagnetic radiation by the resistive sensor and not from the conducted heat; and
   measuring the response of the resistive sensor due to the absorbed electromagnetic radiation and not from the conducted heat.

2. The method of claim 1, wherein measuring comprises measuring the response of the resistive sensor as a function of the modulation frequency.

3. The method of claim 1, wherein measuring comprises measuring the response of the resistive sensor at or near the predetermined frequency.

4. The method of claim 1, wherein:
   the predetermined frequency defines a transition frequency between a low-frequency regime and a high-frequency regime;

the response produced by the resistive sensor in the low-frequency regime is due to electromagnetic radiation absorption and conduction of heat; and the response produced by the resistive sensor in the high-frequency regime is due electromagnetic radiation absorption and not from conduction of heat.

5. The method of claim 1, wherein:

the predetermined frequency defines a transition frequency between a low-frequency regime and a high-frequency regime;

the response produced by the resistive sensor in the low-frequency regime has a first narrow-band power that decreases with increasing modulation frequency; and the response produced by the resistive sensor in the high-frequency regime has a second narrow-band power that is substantially independent of modulation frequency.

6. The method of claim 1, wherein:

the predetermined frequency defines a transition frequency between a low-frequency regime and a high-frequency regime;

the response produced by the resistive sensor in the low-frequency regime has a first AC component due to electromagnetic radiation absorption and a second AC component due to heat conduction; and the response produced by the resistive sensor in the high-frequency regime includes the first AC component and is substantially devoid of the second AC component.

7. The method of claim 1, wherein measuring comprises measuring an average amplitude of the resistive sensor response.

8. The method of claim 1, further comprising determining output optical power of the light source using the measured resistive sensor response.

9. The method of claim 1, further comprising detecting one or both of a change in spacing and contact between the slider and a magnetic recording medium using the resistive sensor.

10. The method of claim 1, wherein the modulation frequency of the light is greater than about 500 KHz.

11. An apparatus, comprising:

a light source configured to generate light;

a modulator coupled to the light source and configured to modulate the light above a predetermined frequency;

a slider configured for heat-assisted magnetic recording and to receive the modulated light;

a resistive sensor integral to the slider and subject to heating by absorption of electromagnetic radiation and conduction of heat, the resistive sensor configured to produce a response due to absorption of the electromagnetic radiation by the resistive sensor and not from the heat conduction in response to the modulated light above the predetermined frequency; and measuring circuitry coupled to the resistive sensor and configured to measure the response of the resistive sensor due to absorbed electromagnetic radiation and not from the heat conduction.

12. The apparatus of claim 11, wherein the measuring circuitry is configured to measure the response of the resistive sensor as a function of the modulation frequency.

13. The apparatus of claim 11, wherein the measuring circuitry is configured to measure the response of the resistive sensor at or near the predetermined frequency.

14. The apparatus of claim 11, wherein the measuring circuitry is configured to measure an average amplitude of the resistive sensor response.

15. The apparatus of claim 11, wherein:

the predetermined frequency defines a transition frequency between a low-frequency regime and a high-frequency regime;

the response produced by the resistive sensor in the low-frequency regime is due to electromagnetic radiation absorption and conduction of heat; and the response produced by the resistive sensor in the high-frequency regime is due electromagnetic radiation absorption and not from the heat conduction.

16. The apparatus of claim 11, wherein:

the predetermined frequency defines a transition frequency between a low-frequency regime and a high-frequency regime;

the response produced by the resistive sensor in the low-frequency regime has a first narrow-band power that decreases with increasing modulation frequency; and the response produced by the resistive sensor in the high-frequency regime has a second narrow-band power that is substantially independent of modulation frequency.

17. The apparatus of claim 11, wherein:

the predetermined frequency defines a transition frequency between a low-frequency regime and a high-frequency regime;

the response produced by the resistive sensor in the low-frequency regime has a first AC component due to electromagnetic radiation absorption and a second AC component due to heat; and the response produced by the resistive sensor in the high-frequency regime includes the first AC component and is substantially devoid of the second AC component.

18. The apparatus of claim 11, wherein the measuring circuitry is further configured to determine output optical power of the light source using the measured resistive sensor response.

19. The apparatus of claim 11, further comprising a detector coupled to the resistive sensor, the detector configured to detect one or both of a change in spacing and contact between the slider and a magnetic recording medium using the resistive sensor.

20. The apparatus of claim 11, wherein the modulation frequency of the light is greater than about 500 KHz.

* * * * *